United States Patent Office 3,201,421
Patented Aug. 17, 1965

3,201,421
PREPARATION OF ALKYL PSORALENS
Kurt D. Kaufman, c/o Dept. of Chemistry, Kalamazoo College, Kalamazoo, Mich.
No Drawing. Filed May 9, 1962, Ser. No. 193,608
9 Claims. (Cl. 260—343.2)

This application is a continuation-in-part of my earlier filed application Serial No. 731,149, filed April 28, 1958, now abandoned.

The present invention relates to a process for the preparation of substituted psoralen compounds, and is particularly concerned with the process for preparing alkyl substituted psoralens, e.g. lower-alkylpsoralens, and with certain novel psoralen compounds produced by such process.

The psoralen compounds are furo-coumarins, i.e. compounds which structurally comprise a cyclic system in which a furan ring is attached to a coumarin molecule, usually at the 6- and 7-carbon atom positions of the coumarin ring. Among the known psoralens are 8-methoxypsoralen and 5-methoxypsoralen. These psoralens have been isolated primarily from natural sources which include, for example, expressed citrus peel oils and plants, such as the *Ammi majus* Linn.

Accordingly, an object of the present invention is to provide a method for the preparation of substituted psoralen compounds, e.g. alkylpsoralens, such as lower-alkylpsoralens.

An additional object of the present invention is to provide novel trialkylpsoralens, especially tri-lower-alkyl-psoralens.

Another object of the present invention is to provide novel dialkylpsoralens, especially certain di-lower-alkyl-psoralens.

It has been found that substituted psoralens, e.g. alkylpsoralens, can be prepared by a method that comprises generally the etherifying of an hydroxy-substituted coumarin to form an aryl-allyl ether, re-arranging said aryl-allyl ether via heat to form an hydroxy-allyl-substituted coumarin in which said allyl substituent is positioned ortho to said hydroxy substituent, halogenating, e.g. brominating, the allyl substituent of said hydroxy-allyl-substituted coumarin, and subjecting the resulting halogenated compound to alkaline conditions causing it to undergo cyclization, thus forming an alkylpsoralen compound.

This method has been found useful in the preparation of a wide variety of substituted psoralen compounds, including particularly the mono-, di-, tri-, and tetra-alkyl-psoralens.

Novel trialkylpsoralen, especially tri-lower alkylpsoralen, compounds have been prepared by the method of the present invention. Such compounds have utility as photosensitizing agents, i.e. as compounds useful in stimulating the formation of melanin in animals and humans. For example, these include the 2′,4,8-tri-lower-alkylpsoralens.

Novel dialkylpsoralens, especially di-lower-alkylpso- ralens, have also been prepared by the process of the present invention. Such compounds also have utility as photosensitizing agents. For example, these include the 2′,8-di-lower-alkylpsoralens, the 2′,4-di-lower-alkyl-psoralens, and the 2′,4-di-lower-alkylisopsoralens.

The novel dialkylated psoralens, trialkylated psoralens, and dialkylated isopsoralens possess the advantage of decreased side effects which characterize known psoralen compounds. For example, the novel psoralen compounds of this invention are useful as photosensitizing agents without gastric discomfort, nausea, nervousness, insomnia, depressed mood, liver damage, etc.

A further characteristic of some of the di- and tri- alkylated psoralens, including especially the 2′,4,8-tri-methylpsoralen, is the absence of a tendency to dimerize to form dimers or other addition products. Such characteristic has proved to be an advantage in some cases.

The psoralen molecule is conventionally represented by the following skeleton structural formula:

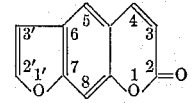

It has also been observed that the dialkylated psoralens exhibit greater fluorescence than such psoralens as the 8-methoxypsoralen, and that the trialkylated psoralens, especially the 2′,4,8-trimethylpsoralen, in turn exhibit greater fluorescence than the dialkylated psoralens, the 2′,4,8-trimethylpsoralen, for example, showing a twenty-five fold increase in fluorescence at a given wave length over the 2′,4-dimethylpsoralen, for example.

In addition, the process of the present invention has provided certain new intermediate compounds, e.g. substituted alkylcoumarins. For example, these include such compounds as the 7-acetoxy-6-(2′,3′-dihalopropyl)-4,8-di-lower-alkylcoumarins.

The novel tri-alkylpsoralens and dialkylpsoralens of this invention can be incorporated in creams, ointments, lotions and the like for topical administration, and in capsules, tablets and the like for oral administration.

The resulting compositions can be administered in the manner disclosed in the Lerner et al. publication (J. Amer. Med. Assoc., vol. 152, p. 14, August 1, 1953).

In general if a suitable hydroxy-substituted coumarin starting material is not available, the process of the present invention first involves the condensation of a phenol, such as 2-methyl resorcinol, with an acetoacetic ester to form the desired hydroxy-substituted coumarin compounds. The hydroxy group is etherified to form a coumarin allyl ether, which then is rearranged, via a Claisen rearrangement, to yield an allyl-substituted, hydroxy-substituted coumarin. Thereafter, the hydroxy substituent is acylated and the adjacent allyl substituent halogenated to form a coumarin compound which then cyclizes under alkaline conditions to produce a substituted psoralen, e.g. a tri-lower-alkyl-psoralen.

In conducting the acetoacetic ester condensation with the appropriate phenol, acid conditions are employed, obtained by the use, preferably, of mineral acids. Concentrated mineral acids, such as sulfuric, are used at temperatures preferably maintained at below about 10 degrees centigrade. With acids such as polyphosphoric, the reaction can be carried out at room temperature or above. The choice of the starting phenolic compound determines the substituent, if any, which is attached to the eighth carbon position of the psoralen molecule. The use of a 2-alkylresorcinol produces an 8-alkyl substituted psoralen. Thus, a 2-methylresorcinol (Example I(a)) and 2-ethylresorcinol (Example VI), yield 8-methyl- and 8-ethyl-substituted psoralens, respectively, via the intermediate coumarins.

Selection of the appropriate alkyl substituted aceto-acetic ester provides the desired alkyl substituents in the third and fourth carbon positions of the psoralen molecule. For example, in Example V(c), the 4-allylre- sorcinol is condensed with the methyl acetoacetic ester, yielding a 3,4-dimethyl-substituted coumarin, the 3- and 4- carbon positions remaining methyl-substituted in the finished psoralen compound. When the acetoacetic ester itself (ethyl acetoacetate) is used, as in Example I(a), only the 4-carbon position in the finished psoralen compound becomes substituted. Further, by replacing the acetoacetic ester with a cyclic beta-ketoester, psoralens containing a 4th ring are produced. Such isocyclic ring is attached to the psoralen molecule at the 3- and 4- carbon positions.

While the condensation of a phenol compound, preferably a dihydric phenol such as resorcinol, with an acetoacetic ester is illustrated herein as the first step of the synthesis, in many instances the desired hydroxy-substituted coumarin is already available. This is especially true if 7-hydroxy-alkylcoumarins are available. In other instances, as in Example III(a), the phenol compound can be reacted with other esters, such as ethyl propiolate, to produce the desired hydroxy-substituted coumarin compound.

The hydroxy substituted coumarin, produced via the acetoacetic ester synthesis or by other means, or if available commercially, is then etherified with an allyl halide, or an alkyl-substituted allyl halide, preferably the allyl chloride or the allyl bromide, to form the corresponding allyl ether, as in Example I(b), Example IV(b) and Example III(b). The reaction is preferably conducted under alkaline conditions, as, for example, with anhydrous potassium carbonate, and the reactants refluxed for a period of twelve or more hours in the presence of a solvent, such as acetone. Under some conditions the reaction will proceed at room temperature in the absence of reflux, as with sodium ethoxide in ethyl alcohol. The intermediate allyl ether is readily recovered by crystallization from petroleum ether, aqueous ethanol and the like. Selection of the appropriately alkyl substituted allyl halide enables the nature of the substituent eventually appearing in the 2'-carbon position of the psoralen molecule to be determined. For example, as in Example VII, use of alpha-methylallyl bromide in the place of allylbromide provides a 2'-ethyl-substituted psoralen, rather than a 2'-methyl-substituted psoralen.

The allyl ether substituent, usually at the 7-carbon position of the coumarin molecule, has been found to undergo a Claisen rearrangement, especially if the coumarin intermediate bears a blocking group in the 8-carbon position. The rearrangement is conducted at a reaction temperature of about 200–225° centigrade, preferably at 215°±5 degrees. The rearrangement is completed in about three hours and the resulting allyl-substituted, hydroxy-substituted coumarin is readily recovered from aqueous ethanol or similar solvent. The rearrangement occurs in good yield, the hydroxy-substituent occupying the position formerly taken by the allyloxy group, with the allyl group migrating to the next adjacent (ortho) position, as, for example, in the 6-allyl-7-hydroxy-4,8-dimethylcoumarin of Example I(c). The rearrangement reaction is highly exothermic and where difficulty has been encountered in the control of the initial temperature, the allyl ether has been refluxed in diethylaniline, which can be subsequently removed by treatment with dilute hydrochloric acid. This procedure gives improved temperature control.

If desired, the hydroxy group may be acylated prior to the halogenation of the allyl group, as in Example I(d), Example II(c) and Example III(d). The acylation is perferably conducted with acetic anhydride in the presence of fused sodium acetate. The reactants are usually refluxed for a period of about four hours and the acylated product, e.g. 7-acetoxy-6-allyl-4,8-dimethylcoumarin, recrystallized from an organic solvent such as absolute alcohol. This step in the synthesis was introduced to assure that halogenation, e.g. bromination, did not also occur in the coumarin nucleus during the subsequent bromination of the allyl group. However, where such nuclear halogenation does not occur, especially where there are no open positions which are positioned ortho- or para- to the hydroxyl group, this step of blocking the hydroxy group can be conveniently omitted and the 6-allyl-7-hydroxy-4,8-dimethylcoumarin, for example, brominated directly.

In the halogenation step, the carbon atoms adjacent the double bond of the allyl group are subjected to addition halogenation, e.g. bromination or chlorination. The 7- acetoxy- or 7-hydroxy-substituted coumarin is dissolved in an organic solvent such as chloroform, the resulting solution maintained under reduced temperature, e.g. 0° centigrade, and the halogen, e.g. bromine in chloroform, introduced at a rate such as to maintain the temperature preferably below about 25° centigrade. The halogenation occurs readily and the resulting product, e.g. 7-acetoxy-6 - (2',3' - dihalopropyl)-4,8-dimethylcoumarin, readily crystallizes from an organic solvent, such as ethanol.

In the final step of this synthesis, a cyclization is conducted between the substituents attached to the 6- and 7-carbon positions of the coumarin molecule to form the psoralen molecule. The cyclization is preferably carried out at reflux temperature and under alkaline conditions. For example, alcoholic potassium hydroxide or sodium ethoxide are employed. In some instances the reaction can be conducted under alkaline conditions but in the absence of heat, in which event the rate of reaction is slower. Alternatively, heating the brominated intermediate, e.g. 6-(2',3'-dibromopropyl)-7-acetoxy (or hydroxy)-4,8-dimethylcoumarin, in the presence of a tertiary amine such as pyridine or symcollidine produces the desired psoralen in good yield. The reaction is usually completed in about two hours or less, the psoralen end product precipitating out following acidification of the reaction mixture. The psoralen compound, e.g. 2',4,8-trimethylpsoralen, is recovered by fractional crystalliation, preferably from chloroform-petroleum ether mixtures or from chloroform alone. If desired, the product can be recovered by filtration through alumina or charcoal columns, followed by crystallization from such organic solvents as methanol, ethanol, chloroform, petroleum ether and the like.

Essentially, while all of the possible steps of the synthesis have been generally described, the synthesis in each instance involves at least (1) the etherification of a hydroxy-substituted coumarin to form an aryl allyl ether, e.g. a coumarin allyl ether, as in Examples I(b), IV(b), and III(b), (2) the Claisen rearrangement whereby the ether substituent is rearranged to form an hydroxy-allyl-substituted coumarin, as in Examples I(c), IV(c), and III(c), (3) the halogenation by addition to the double bond of the allyl or substituted allyl substituent, as in Examples I(e), II(d) and III(e), and (4) the cyclization of the substituents attached to the 6- and 7-carbon atoms of the coumarin intermediate to form the desired substituted psoralen. The minimum number of steps are, of course, required where the necessary hydroxy-substituted alkylcoumarin starting compounds are available.

In some instances, while all of the individual steps of the synthesis are employed, the sequence may vary, as illustrated in Example V, wherein an aryl allyl ether is first prepared in step (a), rearranged via the Claisen rearrangement in step (b), and condensed with an acetoacetic ester thereafter (step c). Subsequent acetylation of the 3-hydroxy group (step d) and halogenation of the allyl group (step e), followed by cyclization (step f), resulted in the formation of the 2',3,4-trimethylpsoralen. In other words, the condensation with acetoacetic ester can alternatively take place after the Claisen rearrangement.

The process is adaptable to the preparation of various alkyl-substituted psoralens, such as, for example, mono-alkyl-, di-alkyl-, tri-alkyl-, and tetra-alkylpsoralens. Thus, by substitution of methylacetoacetic ester or n-butylacetoacetic ester, respectively, for the ethyl acetoacetate (acetoacetic ester) in Example I(a) and by following thereafter the procedure of Example I, the 2',3,4,8-tetramethylpsoralen and 2',4,8-tri-methyl-3-n-butylpsoralen, respectively are produced.

Among the novel di-lower-alkylpsoralens prepared by this general method are the 2',4-di-lower-alkylpsoralens, e.g. 2',4-dimethylpsoralen, the 2',8-di-lower-alkylpsoralens, e.g. 2',8-dimethylpsoralen, and the 2',4-di-lower-alkylisopsoralens, e.g. 2',4-dimethylisopsoralen. The 2',8- dimethylpsoralen, for example, has the following structural formula (Example III):

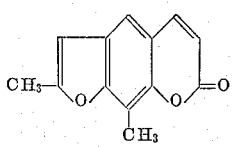

The term, "lower-alkyl," as used in the specification and claims herein denotes a hydrocarbon radical containing up to and including six carbon atoms in its chain.

Among the novel alkyl-subsituted psoralens prepared by this general method are the tri-lower-alkylpsoralens, such as 2',4,8-trimethylpsoralen, for example.

At the same time, numerous novel intermediate, substituted coumarin compounds are produced by the method of the present invention. These include, for example, the 7-hydroxy-6-(2',3'-dihalopropyl)-4,8-di-lower - alkylcoumarins, e.g. 7 - hydroxy-6-(2',3'-dibromopropyl)-4,8-dimethylcoumarin, the 7-acyloxy-6-allyl-4,8-di-lower-alkylcoumarins, e.g. 7-acetoxy-6-allyl-4,8-dimethylcoumarin, and the 7-acyloxy - 6 - (2',3'-dihalopropyl)-4,8-di-lower-alkylcoumarins, e.g. 7-acetoxy-6-(2',3'-dibromopropyl)-4, 8-dimethylcoumarin (Example Ie), the latter having the following structural formula:

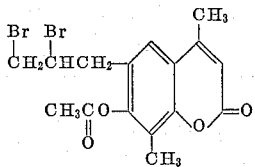

The following examples illustrate more fully the novel processes and compounds of the present invention.

EXAMPLE I.—2',4,8-TRIMETHYLPSORALEN (a) 7-hydroxy-4,8-dimethylcoumarin

Chilled ethyl acetoacetate (157 ml., 1.20 moles) followed by 2-methyl-resorcinol (130 g., 1.04 moles) was dissolved in well-stirred concentrated sulfuric acid (600 ml.) at such a rate as to keep the temperature below 10° (ice bath). The stirred solution was allowed to warm gradually and after three hours was added to water (ca. 8 l.) with mechanical stirring. The product was collected, washed twice with water, and dried at 70–80° until the first sign of darkening. Yield 191.3 g. (95.4%). Recrystallization from aqueous ethanol gave 7-hydroxy-4,8-dimethylcoumarin as colorless needles, M.P. 260.5–261° C. In dilute sodium hydroxide, the compound gives a yellow solution which exhibits blue fluorescence.

Found: C, 69.8; H, 5.2
Calc. $C_{11}H_{10}O_3$: C, 69.5; H, 5.3

(b) 7-allyloxy-4,8-dimethylcoumarin 7-hydroxy - 4,8 - dimethylcoumarin (191.3 g., 1.01 moles), anhydrous potassium carbonate (604 g., 4.37 moles), and allyl bromide (578 ml., 6.22 moles) were refluxed overnight in acetone (ca. 3 l.) with mechanical stirring. The reaction mixture was concentrated nearly to dryness on a steam bath under reduced pressure, water (ca. 8 l.) was added, and the product was collected by filtration. It was washed with 5% NaOH and water (ca. 1.5 l. portions) and was dried in a vacuum desiccator. The dry solid was washed with petroleum ether (30–60°) to remove excess allyl bromide. Removal of the petroleum ether under reduced pressure left 210.0 g. (90.7% yield) of product. The 7-allyloxy-4,8-dimethylcoumarin was crystallized from aqueous ethanol as colorless needles, M.P. 108–109° C.

Found: C, 73.2; H, 6.1
Calc. $C_{14}H_{14}O_3$: C, 73.1; H, 6.1

(c) 6-allyl-7-hydroxy-4,8-dimethylcoumarin 7-allyloxy-4,8-dimethylcoumarin (195.0 g., 0.84 mole) was heated (oil bath) to 215±4° C. (reaction mixture temperature) for three hours and was then poured into absolute alcohol (ca. 1.5 l.). Activated carbon (Norite) (19.5 g.) was added, and the solution was heated to boiling, filtered, and diluted with excess water (ca. 12 l.). The product was collected by filtration and partially dried at 70° for six hours. 6-allyl-7-hydroxy-4,8-dimethylcoumarin was obtained as pale yellow microcrystalline prisms, M.P. 166–168°, by two recrystallizations from aqueous ethanol of a portion of the partially dried solid. The remaining partially dried solid was used in the next step.

Found: C, 73.5; H, 6.2
Calc. $C_{14}H_{14}O_3$: C, 73.1; H, 6.1

(d) 7-acetoxy-6-allyl-4,8-dimethylcoumarin

A solution of the partially dried 6-allyl-7-hydroxy-4,8-dimethylcoumarin obtained in the previous step, acetic anhydride (915 ml., 9.7 moles) and fused sodium acetate (2 g.) was refluxed for four hours and added to water (ca. 8 l.) with mechanical stirring. After excess acetic anhydride had decomposed, the 7-acetoxy-6-allyl-4,8-dimethylcoumarin was collected by filtration, dried, and recrystallized from absolute alcohol, M.P. 144.5–145.5°. Yield 145.4 g. (63.8%, based on 7-allyloxy-4,8-dimethylcoumarin).

Found: C, 70.6; H, 5.9
Calc. $C_{16}H_{16}O_4$: C, 70.6; H, 5.9.

(e) 7-acetoxy-6-(2',3'-dibromopropyl)-4,8-dimethylcoumarin 7-acetoxy-6-allyl - 4,8 - dimethylcoumarin (145.4 g., 0.534 mole) was dissolved in chloroform (ca. 800 ml.). The stirred solution was cooled in an ice bath and bromine (85.2 g., 0.534 mole) in chloroform (200 ml.) was added at such a rate as to keep the temperature below 25°. Evaporation of chloroform on the steam bath left an off-white residue of the crude dibromide. Yield 230.6 g. (quantitative). 7-acetoxy-6-(2',3'-dibromopropyl)-4,8-dimethylcoumarin was crystallized from ethanol as colorless prisms, M.P. 141.5–142.5° C.

Found: C, 44.7; H, 4.1; Br, 36.9
Calc. $C_{16}H_{16}O_4Br_2$: C, 44.5; H, 3.7; Br, 37.0

(f) 2',4,8-Trimethylpsoralen

Crude 7-acetoxy-6-(2',3'-dibromopropyl)-4,8-dimethylcoumarin (245.7 g., 0.57 mole) was refluxed for 1¾ hours with a stirred solution of sodium (65.4 g., 2.85 moles) in magnesium-dried ethanol (2.1 l.). After standing at room temperature for 15 minutes, the reaction mixture was poured into a stirred mixture of ice (8000 g.) and a 3.5% HCl (8 l.). Twelve hours later, the precipitate had coagulated and was collected by filtration; it was thoroughly washed with successive three liter portions of 5% NaOH, water, 0.5% HCl, and water. After partial drying at 60° for five hours, the crude trimethylpsoralen material was thoroughly dried in a vacuum desiccator. Yield 110.1 g. (85%). Fractional crystallization, using activated carbon (Norite) (30.8 g.), from mixtures of chloroform and petroleum ether (30–60°) and finally from chloroform alone gave colorless prisms of 2',4,8-trimethylpsoralen, M.P. 234.5–235° C. Yield 61.8 g. (48%).

Found: C, 73.4; H, 5.4
Calc. $C_{14}H_{12}O_3$: C, 73.7; H, 5.3

Light absorption in methanol: $\lambda_{max.}$ 2500, 2950, 3350; log $\epsilon$ 4.35, 3.99, 3.80; $\lambda_{min.}$ 2250, 2700, 3200; log $\epsilon$ 4.09, 3.68, 3.79.

EXAMPLE II.—2',4-DIMETHYLPSORALEN (a) 3-allyloxyphenyl acetate

A mixture of resorcinol monoacetate (101.3 g., 0.67 mole), anhydrous potassium carbonate (138.2 g., 1.0 mole), and allyl bromide (181.5 g., 1.5 mole) in acetone (300 cc.) was heated under reflux for twenty-four hours and evaporated to dryness. Water (1.5 l.) was added and an ethereal extract of the aqueous solution was washed with 5% aqueous ammonia, dried (magnesium sulphate), and concentrated to an oil which gave, on distillation, 3-allyloxyphenyl acetate (105.5 g., yield 82%), B.P. 82°/0.05 mm., as a colorless oil. This sample gave a faint red-brown ferric chloride color in ethanol.

Found: C, 69.1; H, 6.4; act. H, 0.13
Calc. $C_{11}H_{12}O_3$: C, 68.8; H, 6.4; act. H, 0.00

(b) *4-allylresorcinol*

A solution of 3-allyloxyphenyl acetate (60.2 g., 0.313 mole) in diethylaniline (100 cc., freshly distilled over zinc dust) was heated under reflux, in an atmosphere of nitrogen, for 50 minutes and taken up in ether. After thoroughly washing the ethereal solution with 5% hydrochloric acid, it was extracted with 5% aqueous sodium hydroxide and the oil obtained by acidification of the alkaline solution was isolated with ether. Distillation through a short Vigreaux column gave a mixture of 2-allylresorcinol and 4-allylresorcinol (34.2 g., yield 73%) as a pale yellow oil; B.P. 98°/0.1 mm.; $n_D^{17°}$ 1.5630; which showed an intense red-brown color with ferric chloride in ethanol.

Found: C, 71.9; H, 7.0; act. H, 1.30
Calc. $C_9H_{10}O_2$: C, 72.0; H, 6.7; act. H, 1.34

(c) *7-acetoxy-6-allyl-4-methylcoumarin*

The mixture (prepared above) of 2-allyl- and 4-allyl-resorcinol (5.00 g., 0.033 mole) was dissolved in glacial acetic acid (50 cc.) containing ethyl acetoacetate (4.33 g., 0.033 mole) and the solution was saturated with hydrogen chloride. The next day, the reaction mixture was poured into water and the oil, which separated initially, solidified on keeping for several days. An ethereal solution of the solid was extracted with 5% aqueous ammonia (500 cc.). Acidification of the ammonia extract with dilute hydrochloric acid yielded an oil which solidified after a few minutes. This sold crystallized from aqueous ethanol as colorless, irregular prisms (4.07 g.), M.P. 137–160. Four recrystallizations from ethanol gave star-like clusters of colorless needles of 8-allyl-7-hydroxy-4-methylcoumarin (0.035 g.), M.P. 198–199°. Its infra-red spectrum was identical with that of the authentic sample and it showed a blue fluorescence in aqueous alkali and an intense blue fluorescence in concentrated sulphuric acid, but gave no color with ethanolic ferric chloride.

Found: C, 72.5; H, 5.4
Calc. $C_{13}H_{12}O_3$: C, 72.2; H, 5.6

The recrystallization mother liquors from above were combined and diluted with excess water and a white solid (4.01 g.) was collected by filtration. This solid (1.151 g.) and a few crystals of fused sodium acetate was heated overnight under reflux in acetic anhydride (6.5 cc.). The reaction mixture was stirred with water and, after decomposition was complete, the insoluble solid was collected on a filter. It crystallized from ethanol as a mixture of colorless needles (1.125 g., yield 82%) of 7-acetoxy-8-allyl-4-methylcoumarin and 7-acetoxy-6-allyl-4-methylcoumarin, M.P. 85–110°.

Found: C, 70.0; H, 5.4
Calc. $C_{15}H_{14}O_4$: C, 69.8; H, 5.5

This mixture (0.70 g.) was adsorbed from benzene (25 cc.) on a column of acid-washed alumina (neutral to litmus). A mixture of 50% chloroform in benzene eluted a white residue (0.050 g.) which had appeared as a distinct white band (U.V. irradiation) on the column. This residue crystallized from ethanol as colorless needles of 7-acetoxy-6-allyl-4-methylcoumarin, M.P. 135–136°, which showed an intense blue fluorescence after standing for a few minutes in concentrated sulphuric acid.

Found: C, 69.6; H, 5.1
Calc. $C_{15}H_{14}O_4$: C, 69.8; H, 5.5

(d) *7-acetoxy-6-(2',3'-dibromopropyl)-4-methylcoumarin*

A solution of bromine (0.074 g., 0.461 millimole) in glacial acetic acid (10 cc.) was added dropwise to a well-stirred solution of 7-acetoxy-6-allyl-4-methylcoumarin (0.119 g., 0.461 millimole) in glacial acetic acid (25 cc.) at room temperature. The reaction mixture was diluted with water (300 cc.) and the white precipitate of crude 7-acetoxy - 6 - (2',3' - dibromopropyl) - 4 - methylcoumarin (0.191 g., yield quant.) was collected by filtration. It crystallized from ethanol as pale yellow prisms, M.P. 150–151°.

Found: C, 43.5; H, 3.4; Br, 38.1
Calc. $C_{15}H_{14}O_4Br_2$: C, 43.1; H, 3.4; Br, 38.2

(e) *2',4-dimethylpsoralen*

A solution of crude 7-acetoxy-6-(2',3'-dibromopropyl)-4-methylcoumarin (0.155 g.) and potassium hydroxide (0.26 g.) in ethanol (10 cc.) was heated for two hours under reflux and evaporated to dryness. An aqueous solution of the residue was immediately acidified with dilute hydrochloric acid and the insoluble solid was collected on a filter, washed with 5% aqueous ammonia, and dried. A chloroform solution of the solid was filtered through an activated charcoal column and evaporated to dryness. The white residue crystallized from ethanol as colorless needles of 2',4-dimethylpsoralen (0.044 g., yield 55%), M.P. 161–162°.

Found: C, 73.0; H, 4.7
Calc. $C_{13}H_{10}O_3$: C, 72.9; H, 4.7

Light absorption in methanol: $\lambda_{max.}$ 2450, 2900, 3400, log $\epsilon$ 4.28, 3.82, 3.68; $\lambda_{min.}$ 2700, 3100, log $\epsilon$ 8.56, 3.61.

By substituting alpha-methylallyl bromide for allyl bromide (step *a*) and following the above procedure, the 2'-ethyl-4-methylpsoralen is produced.

By substituting chlorine in chloroform for the bromine in chloroform in Example I(*e*), and by substituting chlorine in glacial acetic acid for the bromine in glacial acetic acid in Example II(*d*), the 7-acetoxy-6(2',3'-dichloropropyl)-4,8-dimethylcoumarin and the 7-acetoxy-6-(2',3' - dichloropropyl)-4-methylcoumarin intermediates, respectively, are produced.

EXAMPLE III.—2',8-DIMETHYLPSORALEN (a) *7-hydroxy-8-methylcoumarin*

A solution of 2-methylresorcinol (1.24 g., 0.01 mole), ethyl propiolate (0.98 g., 0.01 mole), and concentrated sulphuric acid (1.5 cc.) in ethanol (8.5 cc.) was boiled under reflux for twenty-four hours and diluted with water (50 cc.). A pink solid was obtained, which crystallized from ethanol as pink needles of 7-hydroxy-8-methyl-coumarin (1.32 g., yield 75%), M.P. 258–259°, alone or mixed with an authentic specimen. An acetone solution of the pink needles was passed through an activated charcoal column and evaporated to dryness. The residue crystallized from ethanol as colorless needles of 7-hydroxy-8-methylcoumarin, M.P. 258–259°.

(b) *7-allyoxy-4-methylcoumarin*

A mixture of crude 7-hydroxy-8-methylcoumarin (6.55 g., 0.037 mole), anhydrous potassium carbonate (23.5 g., 0.17 mole), and allyl bromide (16.8 cc., 0.19 mole), in acetone (500 cc.) was heated under reflux for sixteen hours and evaporated to dryness. Aqueous ammonia (500 cc. of 5%) was added to the powdered residue and the undissolved solid was collected and washed with water. It crystallized from aqueous ethanol as pale yellow needles of 7-allyloxy-8-methylcoumarin (6.95 g., yield 87%), M.P. 125–125.5°.

Found: C, 72.5; H, 5.8
Calc. $C_{13}H_{12}O_3$: C, 72.2; H, 5.6

(c) *6-allyl-7-hydroxy-8-methylcoumarin*

7-allyloxy-8-methylcoumarin (5.58 g.) was heated in a closed vessel for 75 minutes at 215°. The dark brown solid mass was powdered in a mortar and dissolved in boiling ethanol (charcoal). Addition of excess water to the filtered ethanol solution caused the precipitation of crude 6-allyl-7-hydroxy-8-methylcoumarin (4.46 g., yield 80%) which was obtained as pale yellow, microcrystalline needles, M.P. 153–154°, after two recrystallizations from ethanol.

Found: C, 71.9; H, 5.7
Calc. $C_{13}H_{12}O_3$: C, 72.2; H, 5.6

(d) *7-acetoxy-6-allyl-8-methylcoumarin*

A mixture of 6-allyl-7-hydroxy-8-methylcoumarin (3.70 g.) and a few crystals of fused sodium acetate in acetic anhydride (40 cc.) was heated under reflux for five hours, diluted with water (300 cc.), and stirred until the acetic anhydride had decomposed. The suspended solid was isolated by filtration and obtained as fawn colored prisms of 7- acetoxy-6-allyl-8-methylcoumarin (3.53 g., yield 80%), M.P. 119–119.5°, from ethanol (charcoal).

Found: C, 70.1; H, 5.5
Calc. $C_{15}H_{14}O_4$: C, 69.8; H, 55.5

(e) *7-acetoxy-6-(2′,3′-dibromopropyl)-8-methylcoumarin*

A solution of bromine (2.20 g., 0.0137 mole) in glacial acetic acid (50 cc.) was added dropwise to a well stirred solution of 7-acetoxy-6-allyl-8-methylcoumarin (3.53 g., 0.0137 mole) in glacial acetic acid (150 cc.) at room temperature. Dilution of the reaction mixture with water (1 l.) gave a light tan precipitate of crude 7-acetoxy-6-(2′,3′ - dibromopropyl) - 8 - methylcoumarin (5.74 g., yield quant.) which was obtained as pale yellow prisms, M.P. 129–130°, after two recrystallizations from ethanol.

Found: C, 43.4; H, 3.2; Br, 37.9
Calc. $C_{15}H_{14}O_4Br_2$: C, 43.1; H, 3.4; Br, 38.2

(f) *2′,8-dimethylpsoralen*

A solution of crude 7-acetoxy-6-(2′,3′-dibromopropyl)-8-methylcoumarin (4.53 g., 0.0108 mole) and potassium hydroxide (6.75 g., 0.12 mole) in ethanol (250 cc.) was heated under reflux for two hours, concentrated to one-half of the original volume, diluted with water (400 cc.), and immediately acidified with hydrochloric acid. The next day, the light brown precipitate was collected on a filter, washed with 5% aqueous ammonia, and rinsed with water. A chloroform solution of the dried solid was filtered through an activated charcoal column and evaporated to dryness. The residue crystallized from methanol as colorless prisms of 2′,8-dimethylpsoralen (1.13 g., yield 49%), M.P. 176–177°.

Found: C, 72.8; H, 4.9
Calc. $C_{13}H_{10}O_3$: C, 72.9; H, 4.7

Light absorption in methanol: $\lambda_{max.}$ 2500, 3000, 3350 log ε 439, 412, 3.83; $\lambda_{min.}$ 2300, 2790, 3300, log ε 4.20, 3.77, 3.82.

By substituting 2-ethylresorcinol and 2-propylresorcinol, respectively, for 2-methylresorcinol (step *a*) and following the above procedure, the 2′-methyl-8-ethylpsoralen and 2′-methyl-8-n-propylpsoralen, respectively are prepared.

EXAMPLE IV.—2′,4-DIMETHYLISOPSORALEN (a) *7-hydroxy-4-methylcoumarin*

Dry hydrogen chloride was passed through a well stirred solution of resorcinol (33.0 g., 0.3 mole) and ethyl acetoacetate (38.1 cc., 0.3 mole) in glacial acetic acid (500 cc.) for 90 minutes. The next day, the reaction mixture was poured into water (3 l.) and the precipitate obtained was dissolved in 5% aqueous ammonia (400 cc.). The filtered ammonia solution was cooled in an ice-salt bath and acidified with dilute hydrochloric acid. The 7-hydroxy-4-methylcoumarin (47.0 g., yield 89%), M.P. 184–185° (Russell and Frye, Org. Syn., 21, 23, give M.P. 185°), was collected on a filter.

(b) *7-allyloxy-4-methylcoumarin*

A mixture of 7-hydroxy-4-methylcoumarin (70.0 g., 0.397 mole), anhydrous potassium carbonate (140 g., 1.01 mole), and allyl bromide (100 cc., 1.15 mole) in acetone (2 l.), was heated under reflux for ten hours and evaporated to dryness. The residue was washed with 5% aqueous ammonia (500 cc.) and water, after which it crystallized from aqueous ethanol as colorless needles of 7-allyloxy-4-methylcoumarin (77.2 g., yield 90%), M.P. 100–101° (Baker and Lothian, J. Chem. Soc., 1935, 628, give M.P. 101°).

Found: C, 72.1; H, 5.7
Calc. $C_{13}H_{12}O_3$: C, 72.2; H, 5.6

(c) *8-allyl-7-hydroxy-4-methylcoumarin*

7-allyloxy-4-methylcoumarin (48.0 g.) was heated in a closed vessel at 215° (temperature of reaction mixture) for three hours. The cooled, solid mass was powdered in a mortar and dissolved in boiling ethanol (charcoal). The filtered ethanol solution was diluted with water (1.5 l.) and the pale yellow precipitate of crude 8-allyl-7-hydroxy-4-methylcoumarin (45.1 g., yield 94%) was collected on a filter. After two recrystallizations from ethanol, yellow prisms, M.P. 195.5–197° were obtained. An acetone solution of the yellow prisms was filtered through an activated charcoal column and evaporated to dryness. The residue crystallized from ethanol as star-like clusters of colorless needles, M.P. 198–199° (Baker and Lothian, ibid, give M.P. 193–194°). This compound showed a blue fluorescence in aqueous alkali and an intense blue fluorescence in concentrated sulphuric acid, but gave no ferric chloride color in ethanol.

Found: C, 72.3; H, 5.8
Calc. $C_{13}H_{12}O_3$: C, 72.2; H, 5.6

(d) *7-acetoxy-8-allyl-4-methylcoumarin*

A mixture of crude 8-allyl-7-hydroxy-4-methylcoumarin (45.1 g.) and a few crystals of fused sodium acetate in acetic anhydride was heated under reflux for five hours, diluted with water, and stirred until the acetic anhydride had decomposed. The insoluble solid was collected by filtration and, after two recrystallizations from methanol, colorless needles of 7-acetoxy-8-allyl-4-methylcoumarin (40.0 g., yield 74%), M.P. 87–87.5°, were obtained.

Found: C, 69.8; H, 5.5
Calc. $C_{15}H_{14}O_4$: C, 69.8; H, 5.5

(e) *7-acetoxy-8-(2′,3′-dibromopropyl)-4-methylcoumarin*

A solution of bromine (16.0 g., 0.1 mole) in glacial acetic acid (100 cc.) was added dropwise to a well stirred solution of 7-acetoxy-8-allyl-4-methylcoumarin (25.8 g., 0.1 mole) in glacial acetic acid (200 cc.) which was cooled occasionally (ice-salt bath) to keep its temperature below 20°. The reaction mixture was diluted with water (1 l.) and the yellow tar, which appeared initially, solidified after the solution had stood for an hour. The crude 7-acetoxy-8-(2′,3′-dibromopropyl)-4-methylcoumarin (39.5 g., yield 95%) was collected by filtration and, after three recrystallizations from ethanol, was obtained as thin, pale yellow parallelepipeds, M.P. 156–157°.

Found: C, 43.1; H, 3.4; Br., 37.9
Calc. $C_{15}H_{14}O_4Br_2$: C, 43.1; H, 3.4; Br. 38.2

(f) *2',4-dimethylisopsoralen*

A solution of crude 7-acetoxy-8-(2',3'-dibromopropyl)-4-methylcoumarin (30.0 g., 0.0718 mole) and potassium hydroxide (40.3 g., 0.718 mole) in ethanol (1 l.) was heated under reflux for two hours and concentrated to about one-third of its original volume. The residue was diluted with water (1.5 l.) and immediately acidified with dilute hydrochloric acid. The next day, the solution was filtered and a light brown solid was collected and washed with 5% aqueous ammonia (400 cc.). A chloroform solution of the dried solid was filtered through an activated charcoal column and evaporated to dryness. The residue crystallized from ethanol as colorless prisms of 2',4-dimethylisopsoralen (9.2 g., yield 60%), M.P. 182–183°.

Found: C, 72.7; H, 4.8
Calc. $C_{13}H_{10}O_3$: C, 72.9; H, 4.7
Light absorption in methanol: $\lambda_{max.}$ 2500, 2975, log $\epsilon$ 4.27, 3.93; $\lambda_{min.}$ 2300, 2750, log $\epsilon$ 3.95, 3.66.

By substituting alpha-methylallyl bromide for allyl bromide (step *b*) and following the above procedure, the 2'-ethyl-4-methyl-isopsoralen is prepared.

EXAMPLE V.—2',3,4-TRIMETHYLPSORALEN

Following the general procedure of Example I, comparable steps are conducted with similar materials, although in a different order of synthesis, to give 2',3,4-trimethylpsoralen.

(a) *3-allyloxyphenol*

Resorcinol is reacted with allyl bromide (other alkyl halides such as allyl chloride can be employed) in the presence of anhydrous potassium carbonate, using the procedure of Example I(*b*) to form 3-allyloxyphenol.

(b) *4-allyl-resorcinol*

3-allyloxyphenol is rearranged with the Claisen reaction utilizing heat at about 215° C. to form 4-allylresorcinol, following the procedure of Example I(*c*).

(c) *6-allyl-7-hydroxy-3,4-dimethylcoumarin*

The 4-allylresorcinol is reacted with methylacetoacetic ester in the presence of concentrated sulfuric acid, following the procedure of Example I(*a*), to form 6-allyl-7-hydroxy-3,4-dimethylcoumarin.

(d) *6-allyl-7-acetoxy-3,4-dimethylcoumarin*

6-allyl-7-hydroxy-3,4-dimethylcoumarin is reacted with acetic anhydride in the presence of fused sodium acetate, in the manner of Example I(*d*), to yield 6-allyl-7-acetoxy-3,4-dimethylcoumarin.

(e) *6-(2',3'-dibromopropyl)-7-acetoxy-3,4-dimethylcoumarin*

Utilizing the method of Example I(*e*), the 6-allyl-7-acetoxy-3,4-dimethylcoumarin is brominated in the presence of chloroform to yield 6-(2',3'-dibromopropyl)-7-acetoxy-3,4-dimethylcoumarin.

(f) *2',3,4-trimethylpsoralen*

Following the procedure of Example I(*f*), the 6-(2',3'-dibromopropyl) - 7-acetoxy-3,4-dimethylcoumarin is refluxed in the presence of sodium ethoxide, forming the 2',3,4-trimethylpsoralen. Other 2',3,4 - trialkylpsoralens can be prepared having alkyl groups in place of the 3-methyl group by employing the appropriately substituted acetoacetic ester in place of the methylacetoacetic ester in part (*c*) of Example V, and thereafter conducting the synthesis in the manner of steps (*d*) to (*f*), inclusive. Thus, use of n-butylacetoacetic ester results in the production of 2',3,4-dimethyl-3-n-butylpsoralen, while use of hexylacetoacetic ester in this synthesis yields 2',4-dimethyl-3-hexylpsoralen.

EXAMPLE VI.—2',4-DIMETHYL-8-ETHYLPSORALEN

By substituting 2-ethylresorcinol and 2-n-propylresorcinol respectively, for 2-methylresorcinol in Example I(*a*) and by thereafter following the steps (*b*) to (*f*), inclusive, the 2',4-dimethyl-8-ethylpsoralen and 2',4-dimethyl-8-n-propylpsoralen, respectively, are produced.

EXAMPLE VII.—4,8-DIMETHYL-2'-ETHYLPSORALEN (a) *7-hydroxy-4,8-dimethylcoumarin*

7-hydroxy-4,8-dimethylcoumarin is prepared as in Example I(*a*).

(b) *7-(alpha-methylallyloxy)-4,8-dimethylcoumarin*

7-hydroxy-4,8-dimethylcoumarin is reacted with alpha-methylallyl bromide in the presence of anhydrous potassium carbonate, following the procedure of Example I(*b*), to form 7-(alpha-methylallyloxy)-4,8-dimethylcoumarin.

Thereafter, the following compounds are prepared by employing the corresponding procedures of steps (*c*) to (*f*), inclusive, of Example I.

(c) *6-(gamma-methylallyl)-7-hydroxy-4,8-dimethylcoumarin*

(d) *6-(gamma-methylallyl)-7-acetoxy-4,8-dimethylcoumarin*

(e) *6(2',3'-dibromo-n-butyl)-7-acetoxy-4,8-dimethylcoumarin*

(f) *4,8-dimethyl-2'-ethylpsoralen*

By substituting 2-ethylresorcinol for 2-methylresorcinol (step *a*) and following the above procedure, 4-methyl-2',8-diethylpsoralen is prepared.

EXAMPLE VIII.—2',4-DIMETHYL-8-n-PROPYLPSORALEN (a) *7-hydroxy-4-methylcoumarin*

Prepared as in Example IV(*a*).

(b) *7-allyloxy-4-methylcoumarin*

Prepared as in Example IV(*b*).

(c) *8-allyl-7-hydroxy-4-methylcoumarin*

Prepared as in Example IV(*c*).

(d) *8-n-propyl-7-hydroxy-4-methylcoumarin*

8-allyl-7-hydroxy-4-methylcoumarin is hydrogenated in the presence of a palladium catalyst (platinum can also be used) forming 8-n-propyl-7-hydroxy-4-methylcoumarin.

Thereafter, the following compounds are prepared by employing the corresponding procedures of steps (*b*) to (*f*), inclusive of Example I:

(e) *8-n-propyl-7-allyloxy-4-methylcoumarin*

(f) *8-n-propyl-6-allyl-7-hydroxy-4-methylcoumarin*

(g) *8-n-propyl-6-allyl-7-acetoxy-4-methylcoumarin*

(h) *8-n-propyl-6-(2',3'-dibromopropyl)-7-acetoxy-4-methylcoumarin*

(i) *2',4-dimethyl-8-n-propylpsoralen*

By subsituting alpha-methylallylbromide for allylbromide (step *e*) and thereafter following the procedure of steps (*f*) to (*i*), inclusive, 2'-ethyl-4-methyl-8-n-propylpsoralen is prepared.

In like manner, by following the general process as illustrated in Examples I to VIII, inclusive, additional alkyl substituted psoralens are prepared.

Thus, included among the di-lower-alkylpsoralens are such compounds as 2',4-diethylsoralen, 2'-ethyl-4-n-propylsoralen, 2'-hexyl-4-ethylpsoralen, 2'-n-butyl-4-hexylpsoralen, and the like. Also included are 2',8-diethylpsoralen, 2'-n-propyl-8-hexylpsoralen, 2',8-di-isobutylpsoralen, 2'-hexyl-8-n-butylpsoralen and the like. Additional di-lower-alkylisopsoralens include 2',4-diethylisopsoralen, 2'-hexyl-4-n-butylisopsoralen, 2'-n-propyl-4-hexylisopsoralen, and 2'-ethyl-4-amylisopsoralen, for example.

It is apparent from the previous discussion that many psoralen compounds of the general structure:

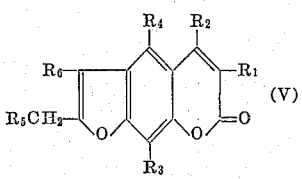

can be prepared by the above general method, which is:

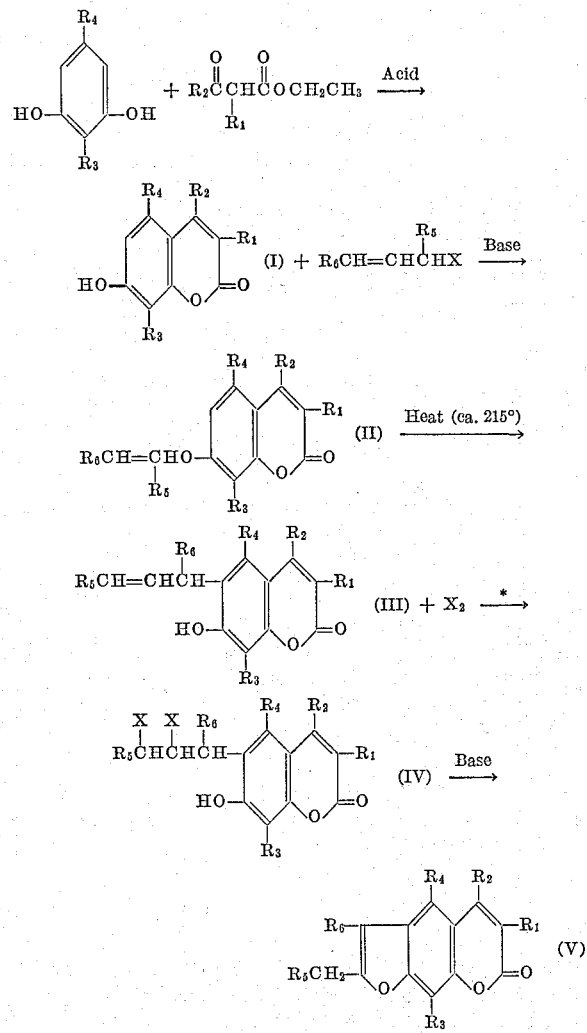

*Usually for best results (III) is acetylated prior to halogenation, which produces an acetylated (IV). The acetyl group is removed during the final step giving (V).

wherein I, II, III and IV are the compounds produced by the previous reaction, wherein $R_1$, $R_2$, $R_3$, $R_4$, $R_5$ and $R_6$ are selected from the group consisting of hydrogen and lower alkyl radicals and wherein X is a halo radical. However, it has been found that only certain compounds have the required properties for a pharmaceutical product, which can be used both orally and topically to produce pigment.

Extensive experimentation has been conducted with isopsoralen and psoralen compounds, and intermediates thereof, prepared by the method of this invention to determine whether there is the required activity. No pattern has been found which would form the basis for a prediction of activity.

Intermediates of the psoralens prepared by the method of this invention are only slightly active or completely inactive. Thus, 7-allyloxy-8-methylcoumarin; 7-allyloxy-3,4,8-trimethylcoumarin; 7-allyloxy-3-n-butyl-4,8-dimethylcoumarin; 7-allyloxy-4,8-dimethylcoumarin; 7-acetoxy-6-(2',3'-dibromopropyl)-3,4,8-trimethylcoumarin; 6-allyl-7-hydroxy-4-methyl-8-n-propylcoumarin; 7-hydroxy-4-methyl-8-n-propylcoumarin; 4,8-dimethyl-7-hydroxycoumarin; and 7acetoxy-6-allyl-4-methyl-8-n-propylcoumarin show little or no activity.

Certain psoralen compounds prepared by the present method and tested for activity were found to have little or no activity. Thus, 2',3,4,8-tetramethylpsoralen; 3-n-butyl-2',4,8-trimethylpsoralen; and 2'-(dimethyl methyl)-psoralen are only slightly active or inactive. It has been found that alkylation at the 3 or 3' position leads to loss of activity. Thus, even closely related compounds show great variance in activity.

Using the general method of this invention, some isopsoralens were prepared and tested. Illustrative is 2'-methyl-7,8-isopsoralen, which was found to have little activity. Further, this was also true of 2',4-dimethyl isopsoralen. Isopsoralens generally appear to be inactive as pigmenting agents.

As can be seen from the above discussion, there is little correlation of activity as a function of structure even when close structural relation is present. The only way that activity can be determined is by testing the response of exposed skin to light.

Of the compounds produced by the method of this invention three classes were found to have the requisites necessary for pigmentation activity. These are the 2',8-di-lower alkylpsoralens, 2',4-di-lower alkylpsoralens and 2',4,8-tri-lower alkylpsoralens.

The 2',4,8-tri-lower alkylpsoralens are preferred because of their very high activity and in particular the 2',4,8-trimethylpsoralen compound is preferred. Particular reasons for preferring 2',4,8-trimethylpsoralen involve activity consideration, the ease of preparation of this compound by the method of this invention, and the relatively low cost of the starting materials. In particular, the methyl group in the 8 position can easily be supplied by the starting material, 2-methylresorcinol, which is readily available. Further, the methyl group in the 4 position can easily be supplied because of the availability of relatively inexpensive acetoacetic ester (ethyl acetoacetate). Thus, for these reasons, 2',4,8-trimethylpsoralen is the preferred species.

Further, there are fundamental differences in the properties of the preferred tri-lower alkylpsoralens compared with the operative di-lower alkylpsoralens that could not be predicted from an examination of their respective chemical structures. Such differences contribute significantly to the superior performance of the tri-lower alkylpsoralens. For example, the tri-lower alkylpsoralens, as discussed above, exhibit fluorescences in the order of twenty-five times those shown by the di-lower alkylpsoralens of this invention. While the ultimate relationship between such fluorescence and physiological activtiy has not been finally determined, it is believed to be of major importance. For these and other reasons, the tri-lower alkylpsoralens of this invention, especially the 2',4,8-trimethylpsoralen, are strongly preferred over the di-lower alkylpsoralens disclosed herein.

Of the di-lower alkylpsoralens, the 2',4 and 2',8 di-lower alkylpsoralens, particularly the 2',8-dimethylpsoralen and 2',4-dimethylpsoralen, are most satisfactory for reasons of economy of preparation and because of suitable oral and topical activity.

Also encompassed by the present invention are the additional intermediate substituted coumarin compounds produced in the synthesis of the above alkyl substituted psoralens.

Various modifications may be made in this invention without departing from the spirit or scope thereof, and it is to be understood that the invention is limited only as defined in the appended claims.

I claim:
1. The compound:

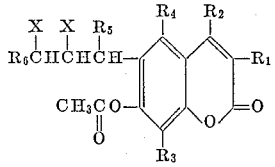

wherein $R_1$, $R_2$, $R_3$, $R_4$, $R_5$, and $R_6$ are selected from the group consisting of hydrogen unsubstituted and lower alkyl groups containing one to seven carbon atoms and X is a halo radical selected from the group consisting of chloro and bromo radicals.

2. 7-acetoxy-6-(2′,3′-dibromopropy) - 4,8-dimethylcoumarin.

3. The method of preparing the compound (A) having the structural formula:

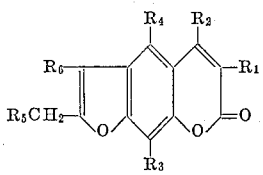

wherein $R_1$, $R_2$, $R_3$, $R_4$, $R_5$ and $R_6$ are selected from the group consisting of hydrogen and lower alkyl radicals which comprises (a) halogenating with a halogenating agent containing a halogen selected from the group consisting of bromine and chlorine the compound (B) having the structural formula:

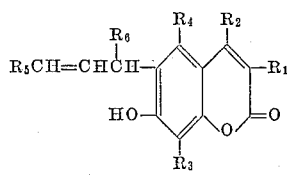

wherein $R_1$, $R_2$, $R_3$, $R_4$, $R_5$ and $R_6$ are selected from the group consisting of hydrogen and lower alkyl radicals to form the compound (C) having the structural formula:

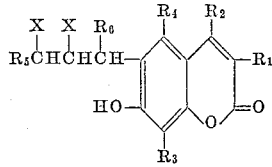

wherein $R_1$, $R_2$, $R_3$, $R_4$, $R_5$ and $R_6$ are selected from the group consisting of hydrogen and lower alkyl radicals and X is a halo radical selected from the group consisting of bromo and chloro radicals; and (b) treating said compound (C) with a strong alkaline material at an elevated temperature and (c) acidifying the alkaline material and separating the product compound (A).

4. The method of claim 3 wherein the halogenation step is facilitated by prior acylation of compound (B) to produce the compound having the structural formula:

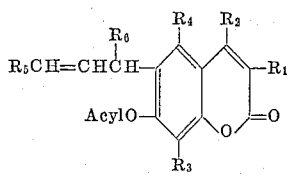

wherein $R_1$, $R_2$, $R_3$, $R_4$, $R_5$ and $R_6$ are selected from the group consisting of hydrogen and lower alkyl radicals and Acyl is an acyl radical.

5. The method of preparing the compound (A) having the structural formula:

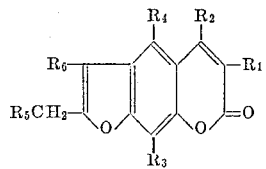

wherein $R_1$, $R_2$, $R_3$, $R_4$, $R_5$ and $R_6$ are selected from the group consisting of hydrogen and lower alkyl radicals which comprises (a) treating the compound (B) having the structural formula:

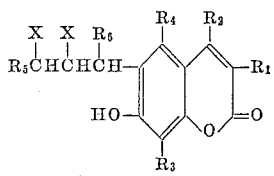

wherein $R_1$, $R_2$, $R_3$, $R_4$, $R_5$ and $R_6$ are selected from the group consisting of hydrogen and lower alkyl radicals and X is a halo radical selected from the group consisting of chloro and bromo radicals with a strong alkaline material at an elevated temperature and (b) acidifying the alkaline material and separating the product compound (A).

6. The method of preparing the compound (A) having the structural formula:

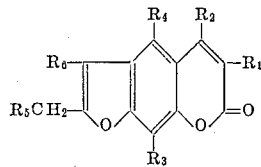

wherein $R_1$, $R_2$, $R_3$, $R_4$, $R_5$ and $R_6$ are selected from the group consisting of hydrogen and lower alkyl radicals which comprises (a) reacting the compound (B) having the structural formula:

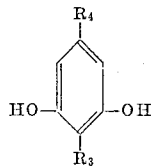

wherein $R_3$ and $R_4$ are selected from the group consisting of hydrogen and lower alkyl radicals with the compound (C) having the structural formula:

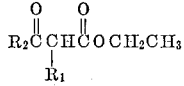

wherein $R_1$ and $R_2$ are selected from the group consisting of hydrogen and lower alkyl radicals in a strong acid to produce the compound (D) having the structural formula:

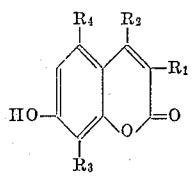

wherein $R_1$, $R_2$, $R_3$ and $R_4$ are selected from the group consisting of hydrogen and lower alkyl radicals; (b) reacting said compound (D) with the compound (E) having the structural formula:

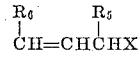

wherein $R_5$ and $R_6$ are selected from the group consisting of hydrogen and wherein X is selected from the group consisting of chloro and bromo radicals and lower alkyl radicals in the presence of an alkaline material and heating the products at an elevated temperature to form the compound (F) having the structural formula:

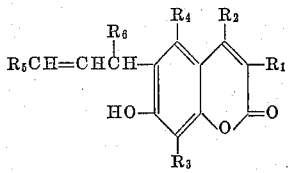

wherein $R_1$, $R_2$, $R_3$, $R_4$, $R_5$ and $R_6$ are selected from the groups consisting of hydrogen and lower alkyl radicals; and (c) halogenating the said compound (F) to form the compound (G) having the structural formula:

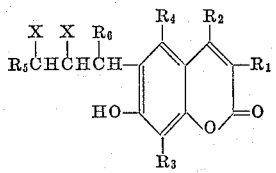

wherein $R_1$, $R_2$, $R_3$, $R_4$, $R_5$ and $R_6$ are selected from the group consisting of hydrogen and lower alkyl radicals and X is a halo radical selected from the group consisting of bromo and chloro radicals; and (d) treating said compound (G) with a strong alkaline material at an elevated temperature and (e) acidifying the alkaline material and separating the product compound (A).

7. The method of claim 6 wherein said product compound (A) is 2′,4,8-trimethylpsoralen.

8. The method of preparing the compound (A) having the structural formula:

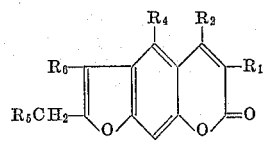

wherein $R_1$, $R_2$, $R_4$, $R_5$ and $R_6$ are selected from the group consisting of hydrogen and lower alkyl radicals which comprises: (a) reacting the compound (B) having the structural formula:

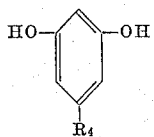

wherein $R_4$ is selected from the group consisting of hydrogen and lower alkyl radicals with the compound (C) having the structural formula:

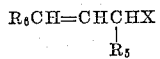

wherein $R_5$ and $R_6$ are selected from the group consisting of hydrogen and lower alkyl radicals and wherein X is selected from the group consisting of bromo and chloro radicals in the presence of an alkaline material and heating the product at an elevated temperature to form the compound (D) having the structural formula:

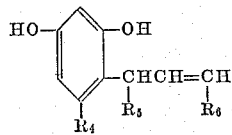

wherein $R_4$, $R_5$ and $R_6$ are selected from the group consisting of hydrogen and lower alkyl radicals; (b) reacting said compound (D) with the compound (E) having the structural formula:

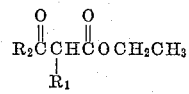

wherein $R_1$ and $R_2$ are selected from the group consisting of hydrogen and lower alkyl radicals in a strong acid to produce the compound (F) having the structural formula:

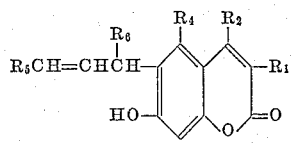

wherein $R_1$, $R_2$ $R_4$, $R_5$ and $R_6$ are selected from the group consisting of hydrogen and lower alkyl radicals; (c) halogenating said compound (F) to form the compound (G) having the structural formula:

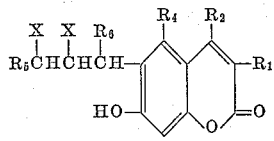

wherein $R_1$, $R_2$, $R_4$, $R_5$ and $R_6$ are selected from the group consisting of hydrogen and lower alkyl radicals and X is a halogen selected from the group consisting of chlorine and bromine; and (d) treating said compound (G) with a strong alkaline material at an elevated temperature and (e) acidifying the alkaline material and separating the product compound (A).

9. 7-acetoxy-6-(2′,3′-dichloropropy) - 4,8-dimethylcoumarin.

References Cited by the Examiner

UNITED STATES PATENTS 2,647,133    7/33    Long et al. _____ 260—343.2

OTHER REFERENCES

Chatterjee et al.: Jour. Amer. Chem. Soc., vol. 71 (1949), page 607.

Elderfield: Heterocyclic Compounds, Wiley and Sons, New York, vol. 2 (1951), pages 8 and 12.

Fowlks et al.: Nature, vol. 181 (Feb. 22, 1958), pages 571 and 572.

Horning et al.: Jour. Amer. Chem. Soc, vol 72 (1950), pages 1514 and 1516.

Krishnaswamy et al.: Proc. Ind. Acad. Sci., vol. 13A (1951), pages 43–48.

Limaye et al.: Chem. Abstracts, vol. 31 (1937), page 2207.

Pathak et al.: Jour. of Investigative Dermatology, vol. 32 (1959), pages 255–262.

Rangaswami et al.: Proc. Ind. Acad. Sci., vol. 7A (1938), pages 8–12.

Sethna et al.: Chemical Reviews, vol. 36, No. 1 (1945), page 46.

WALTER A. MODANCE, *Primary Examiner.*

NICHOLAS S. RIZZO, *Examiner.*

UNITED STATES PATENT OFFICE
CERTIFICATE OF CORRECTION

Patent No. 3,201,421                                            August 17, 1965

Kurt D. Kaufman

It is hereby certified that error appears in the above numbered patent requiring correction and that the said Letters Patent should read as corrected below.

Column 7, line 44, for "137-160" read -- 137-160° --; column 8, line 68, for "7-allyoxy-4-methylcoumarin", in italics, read -- 7-allyloxy-8-methylcoumarin --, in italics; column 9, line 65, for "439, 412" read -- 4.39, 4.12 --; column 15, line 15, for "unsubstituted and" read -- and unsubstituted -- line 19, for "dibromopropy" read -- dibromopropyl --; column 17, lines 1 to 3, strike out "ing of hydrogen and wherein X is selected from the group consisting of chloro and bromo radicals and lower alkyl radicals in the presence of an alkaline material" and insert instead -- ing of hydrogen and lower alkyl radicals and wherein X is selected from the group consisting of chloro and bromo radicals in the presence of an alkaline material --; column 18, line 39, for "-dichdoropropy" read -- -dichloropropyl --.

Signed and sealed this 3rd day of May 1966.

(SEAL)
Attest:

ERNEST W. SWIDER                                        EDWARD J. BRENNER
Attesting Officer                                    Commissioner of Patents